United States Patent
Berteussen et al.

(10) Patent No.: US 8,995,223 B2
(45) Date of Patent: Mar. 31, 2015

(54) METHOD FOR REMOVING SCHOLTE WAVES AND SIMILAR GROUND ROLL TYPE WAVES FROM SEISMIC SEA BOTTOM DATA SHALLOW WATERS

(75) Inventors: Karl-Andreas Berteussen, Oslo (NO); Yuefeng Sun, College Station, TX (US); Zhao Zhang, College Station, TX (US)

(73) Assignee: The Petroleum Institute, Abu Dhabi (AE)

( * ) Notice: Subject to any disclaimer, the term of this patent is extended or adjusted under 35 U.S.C. 154(b) by 574 days.

(21) Appl. No.: 13/271,244

(22) Filed: Oct. 12, 2011

(65) Prior Publication Data
US 2012/0092961 A1    Apr. 19, 2012

Related U.S. Application Data

(60) Provisional application No. 61/392,596, filed on Oct. 13, 2010.

(51) Int. Cl.
*G01V 1/38* (2006.01)
*G01V 1/36* (2006.01)

(52) U.S. Cl.
CPC .............. *G01V 1/364* (2013.01); *G01V 1/3808* (2013.01); *G01V 2210/242* (2013.01)
USPC .................................. 367/21; 367/38; 367/43

(58) Field of Classification Search
CPC ......... G01V 1/364; G01V 1/28; G01V 1/368; G01V 2210/32
USPC .......................................... 367/15, 24, 38, 43
See application file for complete search history.

(56) References Cited

U.S. PATENT DOCUMENTS

| | | | | |
|---|---|---|---|---|
| 5,781,503 | A * | 7/1998 | Kim ................................. | 367/45 |
| 2003/0078734 | A1 * | 4/2003 | Ozbek ............................. | 702/14 |
| 2007/0255501 | A1 * | 11/2007 | Kellogg .......................... | 702/16 |
| 2010/0128563 | A1 * | 5/2010 | Strobbia et al. ................. | 367/49 |
| 2010/0286921 | A1 * | 11/2010 | Lee et al. ........................ | 702/17 |
| 2011/0069581 | A1 * | 3/2011 | Krohn ............................. | 367/43 |
| 2011/0134722 | A1 * | 6/2011 | Virgilio et al. ................. | 367/75 |
| 2011/0310702 | A1 * | 12/2011 | Love et al. ...................... | 367/49 |

OTHER PUBLICATIONS

Poggi et al, "Time-Frequency-Wavenumber Analysis of Surface Waves Using the Continuous Wavelet Transform" Pure Appl. Geophys. 170 (Mar. 2013), 319-335.*

* cited by examiner

*Primary Examiner* — Ian J Lobo

(57) ABSTRACT

The various embodiments of the present invention provide a method for removing a Scholte waves and similar ground roll type waves from a seismic sea bottom data in a shallow water. The method comprises acquiring seismic sea bottom data in a shallow waters, applying a time-frequency-wave number (t-f-k) transform on the acquired seismic sea bottom data, identifying a time-frequency relationship of a surface wave based on a specific wave number, identifying a frequency-wave number relationship of a surface wave based on a specific time, designing a time varying frequency-wave number filter in the time-frequency-wave number domain to separate the surface wave, applying a time varying frequency-wave number filtering process to remove an undesired energy and inversing a filtered record by applying an inverse S-Transform operation and an inverse Fourier Transform operation.

9 Claims, 6 Drawing Sheets

METHOD FOR REMOVING SCHOLTE WAVES AND SIMILAR GROUND ROLL TYPE WAVES FROM SEISMIC SEA BOTTOM DATA SHALLOW WATERS

CROSS-REFERENCE TO RELATED APPLICATION

This application claims the benefit of U.S. Provisional Application Ser. No. 61/392,596, filed Oct. 13, 2010, which is incorporated herein by reference in its entirety.

BACKGROUND

1. Technical Field

The embodiments herein generally relates to a method of processing seismic data and particularly to a method of processing a multi-component marine seismic data. The embodiments herein more particularly relates to a method of processing a multi-component marine seismic data in order to estimate the properties of the seafloor and sensor calibration filters in a shallow water environment.

2. Description of the Related Art

The marine surveys can also be conducted using the sensors attached to an Ocean Bottom Cable (OBC) laid out on an ocean bottom rather than in towed streamers. Due to the operational limitations, most of these types of surveys are conducted in the water bodies with depths less than 70 meters. However OBC crews in recent years have acquired 3D surveys in depths up to 2000 meters. One operational advantage is that obstacles (such as platforms) do not limit the acquisition as much as they do for streamer surveys. Most of the OBC surveys use the dual component receivers, combining a pressure sensor (hydrophone) and a vertical particle velocity sensor (vertical geophone). The OBC surveys can also use four components, i.e. a hydrophone component plus the three orthogonal velocity sensors. The Four component OBC surveys have the advantage of being able to also record shear waves, which do not travel through water. Hence the multiple component OBC surveys can lead to improved subsurface imaging.

Some of the world's important oil and gas fields are in the Persian Gulf where the average water depth could be as shallow as 10-15 m. 4C ocean bottom cable (OBC) seismic data collected in a shallow water environment record the strong surface waves due to the shallow water depth and hard sea bottom. Also they represent a considerable noise problem not only for the actual shot but also for the subsequent shots due to the inadequate time delays between the shots, resulting in severe contamination of the reflection signals.

Frequency filtering (or widowed frequency filtering) and fk-filtering are the two main processing techniques used currently for extracting the surface waves from seismic records. These methods are insufficient in the shallow water environment for two reasons. First, these two techniques are designed in the frequency domain based on Fourier Transform and have the same effect on the whole time series. This causes errors in seismic data processing because seismic data, being non-stationary in nature, has varying frequency content in time. Secondly, the surface waves are highly dispersed and scattered in the shallow water environment which brings difficulties of defining a single, appropriate reject zone on the f-k panel.

Therefore, there is a need for a method of processing a multi-component marine seismic data in a shallow water environment. There is also a need for a reliable surface wave analysis tool to hydrocarbon exploration and reservoir management of super-giant carbonate reservoirs in the shallow water environment.

The abovementioned shortcomings, disadvantages and problems are addressed herein and which will be understood by reading and studying the following specification.

OBJECTS OF THE EMBODIMENTS

The primary object of the embodiments herein is to provide a method for processing multi-component marine seismic data in order to estimate the properties of the seafloor and sensor calibration filters in a shallow water environment.

Another object of the embodiments herein is to provide a reliable surface wave analysis tool for hydrocarbon exploration and reservoir management of super-giant carbonate reservoirs in a shallow water environment.

Yet another object of the embodiments herein is to provide a method to design an advanced seismic data analysis tool for a shallow water environment.

Yet another object of the embodiments herein is to provide a method to extract the Scholte waves, interface waves and multiple waves from OBS data without removing other seismic signals.

Yet another object of the embodiments herein is to provide a method to dynamically analyze a surface wave spectrum over a period of time.

These and other objects and advantages of the embodiments herein will become readily apparent from the following detailed description taken in conjunction with the accompanying drawings.

SUMMARY

The various embodiments herein provide a method for removing a Scholte waves and similar ground roll type waves from a seismic sea bottom data in a shallow water. The method for removing a Scholte waves and similar ground roll type waves from a seismic sea bottom data in a shallow water comprises acquiring a seismic sea bottom data in a shallow waters, applying a time-frequency-wave number (t-f-k) transform on the acquired seismic sea bottom data to get a three-dimensional result in a time-frequency-wave number domain, identifying a time-frequency relationship of a surface wave based on a specific wave number, identifying a frequency-wave number relationship of a surface wave based on a specific time, designing a time varying frequency-wave number filter in the time-frequency-wave number domain based on the identified time-frequency relationship and the identified frequency-wave number relationship to separate the surface wave, applying a time varying frequency-wave number filtering process to remove an undesired energy and inversing a filtered record by applying an inverse S-Transform operation and an inverse Fourier Transform operation. The time varying frequency-wave number filtering is performed to filter the time varying seismic waves and to distinguish between a plurality of signals of a same frequency at different times to extract Scholte waves, interface waves and multiple waves from an ocean bottom seismic data without removing other seismic signals.

According to one embodiment herein, the S-transform operation and the t-f-k transform operation are applied to analyze surface waves and carry out a dynamic analysis on a surface wave spectrum over time.

According to one embodiment herein, the step of applying S-transform operation comprises adopting a Gaussian window and wherein a width of the Gaussian window scales inversely with a frequency and a height of the Gaussian window scales linearly with a frequency to decompose the signal into a time-frequency independently.

According to one embodiment herein, the acquired seismic sea bottom data are first transformed from the t-x domain to the t-k domain through one-dimensional Fourier transform over a spatial variable and then to S-transform over time.

According to one embodiment herein, a plurality of types of seismic events are partitioned from one another to separate S-waves to filter unwanted energy, based on a comparison of t-x domain representation with a F-K domain.

According to one embodiment herein, the step of applying a time varying frequency-wave number filtering process comprises multiplying a time frequency spectrum (TFK) with a weighting function.

According to one embodiment herein, a weighting function applied to a useful signal is more than a weighting function applied to an unwanted signal.

According to one embodiment herein, the method further comprises measuring propagation characteristics of the surface wave to estimate a shear velocity and attenuation of sediment in seafloor indirectly.

According to one embodiment herein, the weighting function for time-frequency-wave number is designed to extract or remove the surface wave, P-related interface waves and reflected waves separately.

BRIEF DESCRIPTION OF THE DRAWINGS

The other objects, features and advantages will occur to those skilled in the art from the following description of the preferred embodiment and the accompanying drawings in which.

Figure 1:
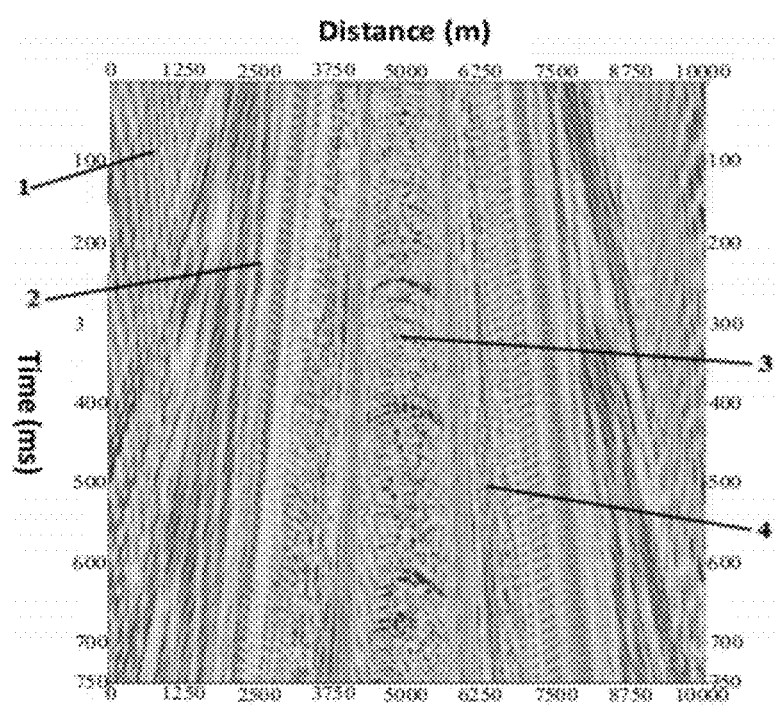
FIG. 1 illustrates a part of a hydrophone record from a 2D 4C OBC data set acquired in the shallow water environment, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments of the present invention provide a method for removing a Scholte waves and similar ground roll type waves from a seismic sea bottom data in a shallow water. According to an embodiment herein, the method for removing Scholte waves and similar ground roll type waves from a seismic sea bottom data in a shallow water environment comprises acquiring seismic sea bottom data in a shallow waters, applying a time-frequency-wave number (t-f-k) transform on the acquired seismic sea bottom data to get a three-dimensional result in a time-frequency-wave number domain, identifying a time-frequency relationship of a surface wave based on a specific wave number, identifying a frequency-wave number relationship of a surface wave based on a specific time, designing a time varying frequency-wave number filter in the time-frequency-wave number domain based on the identified time-frequency relationship and the identified frequency-wave number relationship to separate the surface wave, applying a time varying frequency-wave number filtering process to remove an undesired energy and inversing a filtered record by applying an inverse S-Transform operation and an inverse Fourier Transform operation. The time varying frequency-wave number filtering is performed to filter the time varying seismic waves and to distinguish between the signals of a same frequency at different times to extract Scholte waves, interface waves and multiple waves from the ocean bottom seismic data without removing other seismic signals.

According to one embodiment herein, the S-transform operation and the t-f-k transform operation are applied to analyze surface waves and carry out a dynamic analysis on a surface wave spectrum over time.

According to one embodiment herein, the step of applying S-transform operation comprises adopting a Gaussian window, and wherein a width of the Gaussian window scales inversely with a frequency and a height of the Gaussian window scales linearly with a frequency, to decompose the signal into a time-frequency independently.

According to one embodiment herein, the acquired seismic sea bottom data are first transformed from the t-x domain to the t-k domain through one-dimensional Fourier transform over a spatial variable and then to S-transform over time.

According to one embodiment herein, a plurality of types of seismic events are partitioned from one another to separate S-waves to filter unwanted energy, based on a comparison of t-x domain representation with a F-K domain.

According to one embodiment herein, the step of applying a time varying frequency-wave number filtering process comprises multiplying a time frequency spectrum (TFK) with a weighting function.

According to one embodiment herein, a weighting function applied to a useful signal is more than a weighting function applied to an unwanted signal.

According to one embodiment herein, the method further comprises measuring propagation characteristics of the surface wave to estimate a shear velocity and attenuation of sediment in seafloor indirectly.

According to one embodiment herein, the weighting function for time-frequency-wave number is designed to extract or remove the surface wave, P-related interface waves and reflected waves separately.

Figure 2:
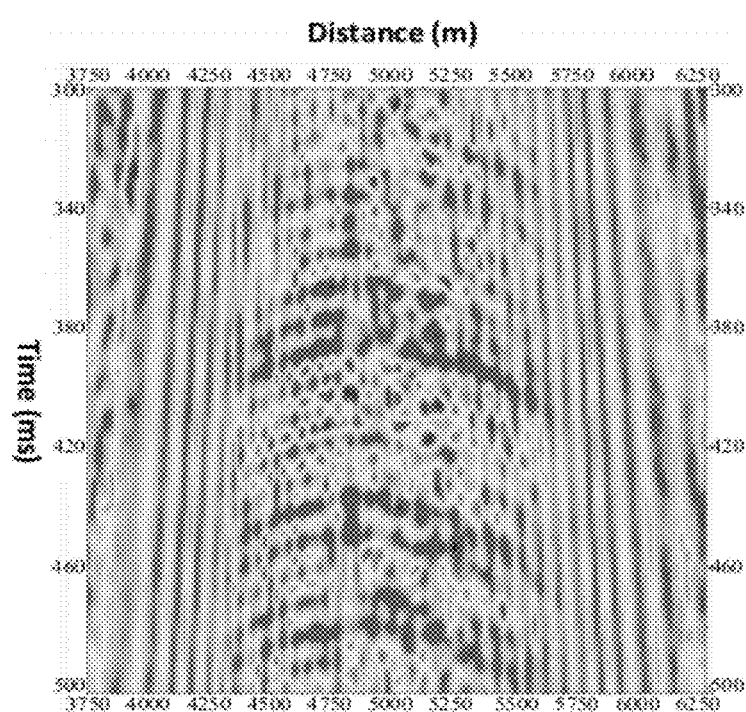
FIG. 2 illustrates an enlarged portion of a hydrophone record from a 2D 4C OBC data set acquired in the shallow water environment, according to one embodiment herein.

FIG. 1 illustrates a part of a hydrophone record from a 2D 4C OBC data set acquired in the shallow water environment, according to one embodiment herein. FIG. 2 is an enlarged view of a part of a hydrophone record from a 2D 4C OBC data set acquired in the shallow water environment. The 2D 4C OBC data set is acquired from the sea in a very shallow water depth of about 10 m and a hard bottom with P-wave velocity varying from 3 to 4.8 km/s. FIG. 1 illustrates a part of a hydrophone record from this data set (2D 4C OBC data). The maximum offset of the field data is 10 km. The receiver interval is 25 m and the recording length is 6 seconds. The surface waves existing in this marine data are the trapped waves in the water column and the interface waves generated in hard sea-bottom. The recorded data set displays very strong Scholte waves 1 and 4 as shown in FIG. 1, P-related interface waves 2 and refracted waves 3 as shown in FIG. 1, which all influence the interpretation of the reflection events. Because of the very shallow water depth (10 m), the Scholte wave keep rolling for a very long time which represents a serious problem to the data processing. Both the Scholte wave from the present shot 4 as shown in FIG. 1 and the previous shot 1 as shown in FIG. 1 present in the shot record. It also shows the velocity of the Scholte wave. After zooming out the middle part of the shot record 3, we note the Scholte waves still present with a very low velocity as shown in FIG. 2.

Figure 3:
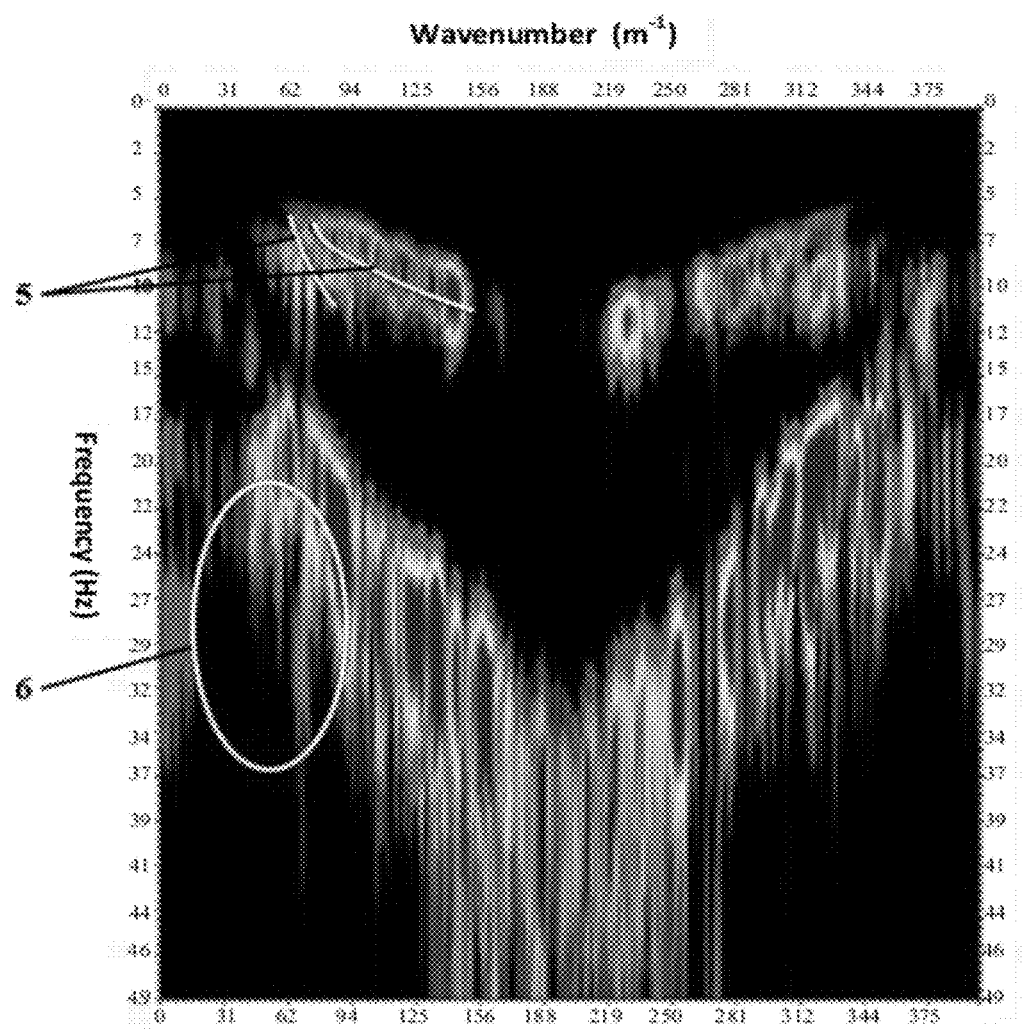
FIG. 3 illustrates a F-K spectrum indicating a Scholte waves and a P-related interface waves separated from the hydrophone record acquired in the shallow water environment, according to one embodiment herein.

FIG. 3 illustrates a t-f-k transform of the hydrophone record from a 2D 4C OBC data set acquired in the shallow water environment, according to one embodiment herein. The t-f-k transform of the hydrophone record from a 2D 4C OBC data set acquired in the shallow water environment at time 600 ms is as shown in FIG. 3. Different seismic events are separated. The dominant frequency of Scholte waves is relatively low (<12 Hz). However, the dipping events map onto curves instead of straight lines in the f-k domain 5 (the curves lines 5 in FIG. 3), which means the velocity and frequency of the Scholte waves changes in the shallow water environment. The velocity of Scholte waves is in the range from 450 m/s to 1200 m/s. The dominant frequency of P-related interface waves is in the range from 20 Hz to 50 Hz. However, the spatial aliasing of strong surface waves affects the signal band of reflected waves 6 (the circle 6 in FIG. 3). For the geometric spreading, the energy decreases with the time and the frequency distribution changes with the time. In such case, surface wave extraction can no longer be done by a well-localized filter. Hence, the frequency-domain and frequency-time domain is considered separately in the present invention.

Figure 4:
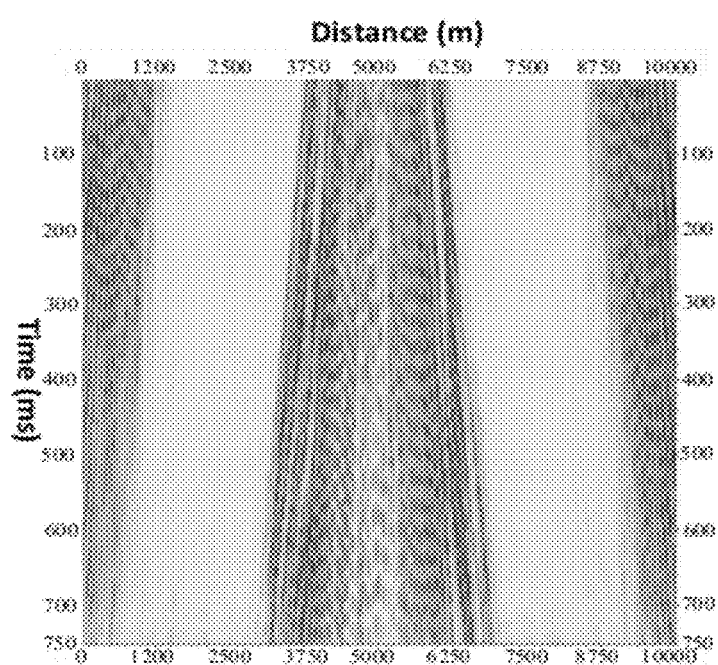
FIG. 4 illustrates sholte waves separated from FIG. 1 after removal of the surface waves from the OBC data set acquired in the shallow water environment, according to one embodiment herein.
Figure 5:
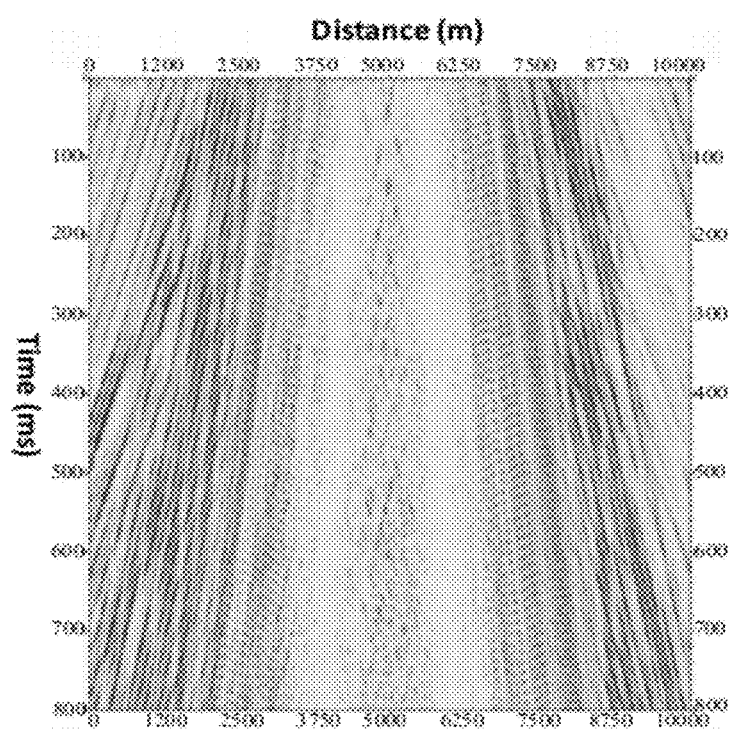
FIG. 5 illustrates P-related interface waves separated from FIG. 1 after removal of the surface waves from the OBC data set acquired in the shallow water environment, according to one embodiment herein.

FIG. 4 is a time over distance graph illustrating a Scholte waves separated from the hydrophone record acquired in the shallow water environment, according to one embodiment herein and FIG. 5 is a time over distance graph illustrating a P-related interface waves separated from the hydrophone record acquired in the shallow water environment. The surface wave extraction is done by considering frequency-domain and frequency-time domain separately. The weighting function F (t, f, k) is designed to extract or remove the surface wave, P-related interface waves and reflected waves separately. The surface wave and P-related interface waves are as shown in FIG. 4 and FIG. 5 respectively. Almost no seismic reflection has been removed.

Figure 6:
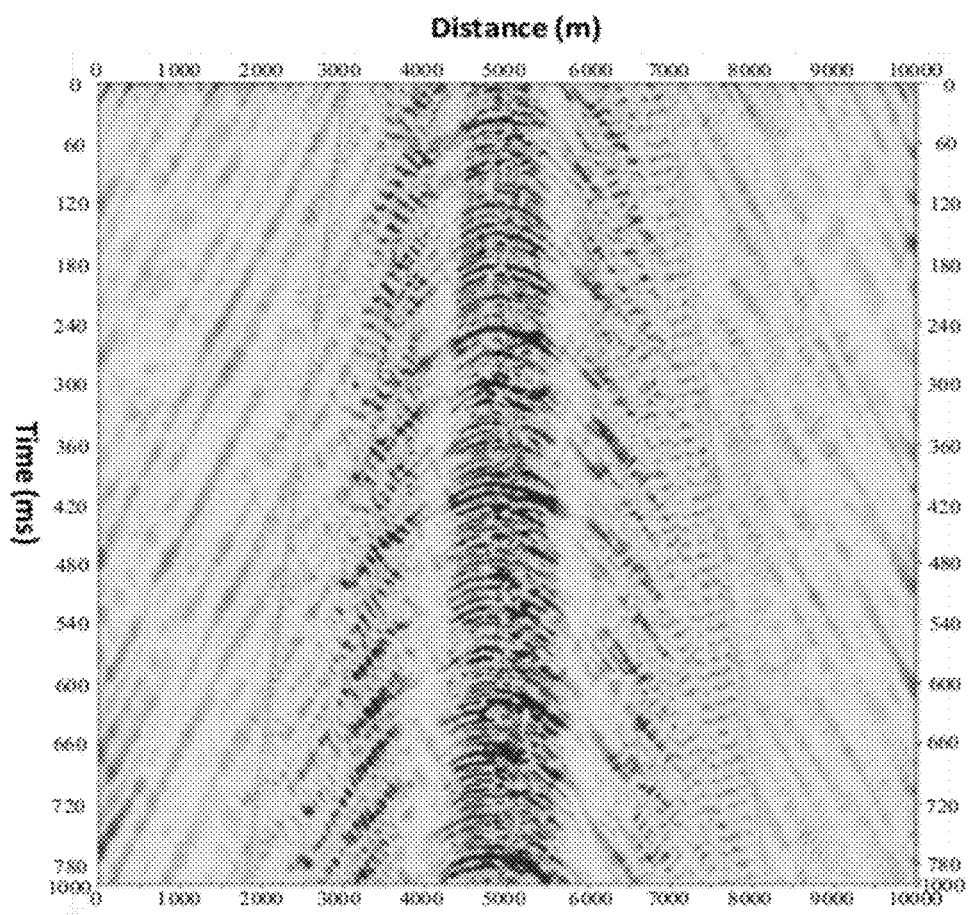
FIG. 6 illustrates reflected waves separated from FIG. 1 after removal of the surface waves from the OBC data set acquired in the shallow water environment, according to one embodiment herein.

FIG. 6 is a time over distance graph illustrating reflected waves after removal of the surface waves from the OBC data set acquired in the shallow water environment, according to one embodiment herein. The reflections are clearly visible inside the Scholte wave zone due to a good separation between surface wave and reflection energy in the frequency domain. Two parts of the Scholte waves are abstracted and the particular low velocity part also is presented. Surface wave dispersion arises because of the velocity stratification of the Earth's interior, longer wavelengths penetrating to greater depths and hence sampling higher velocities. A well abstraction of surface wave brings the chance to infer the shear-wave properties of the sea bed. Very low velocity Scholte wave occurs in shallow environment.

Application of S Transform to decompose the signal into time-frequency independently. The S transform can conceptually be viewed as a hybrid of short-time Fourier analysis and wavelet analysis. Instead of a pre-selecting window length, the S Transform adopts the Gaussian window. In Gaussian window, width scales inversely and height scales linearly with the frequency, to decompose the signal into time-frequency independently.

The S transform of a time series u (t) is defined as:

$$S_x(t,f) = \int_{-\infty}^{+\infty} u(\tau) w(t-\tau, \sigma(f)) \exp(-j2\pi f \tau) d\tau$$

With a constraint $$\int_{-\infty}^{+\infty} w(t-\tau, \sigma(f)) d\tau = 1$$

where the w ($\tau$, $f$) is the Gaussian window $$w(t, \sigma(f)) = \frac{1}{\sigma(f)\sqrt{2\pi}} \exp\left(-\frac{t^2}{2\sigma^2(f)}\right)$$

$\tau$ and t are the time and $f$ is the frequency variables.

The S spectrum is invertible and the inverse transform algorithm is:

$$u(t) = \int_{-\infty}^{+\infty} \left[ \int_{-\infty}^{+\infty} S(\tau, f) d\tau \right] \exp(j2\pi f t) df$$

The similarity between S transform and the short-time Fourier transform (STFT) is that they are both derived from the Fourier transform of the time series multiplied by a time-shift window. However, unlike STFT, the standard deviation $\sigma(f)$ in S transform is actually a function of frequency. Consequently, the window function is also a function of time and frequency. As the width of the window is dictated by the frequency, it is apparent that the window is wider in the time domain at lower frequencies which means the window provides good localization in the frequency domain for low frequencies. Due to the low frequency spectrum of surface wave, this property makes S transform more appropriate for the further analysis on it.

The application of F-K filter transform separates the original overlapping dipping events in the F-K domain on the basis of their dips. Based on S transform idea, the t-f-k transforms designs a time varying F-K filter. Basically, the data are first transformed from the t-x domain to the t-k domain through one dimensional Fourier transform over spatial variable, then S transform over time is:

For a given input signal u (t, x), the t-f-k transform is defined as:

$$TFK(\tau, f, k) = \int_{-\infty}^{+\infty} u(t, x) \exp(-j2\pi k x) w(t-\tau, \sigma(f)) \exp(-j2\pi f \tau) d\tau,$$

where w (t,$\sigma(f)$) is defined as previous section. The integration of t-f-k results over time is regarded as the FK transform of u (t, x). T-f-k transform appears to have advantage over normal FK transform when the f-k panel of seismic data varies over time, especially for the data obtained from shallow water environment.

In the FK domain, the various types of seismic events are partitioned from one another, compared with the t-x domain representation. The basic idea for separating the surface waves is filtering the unwanted energy on the basis of their dips. Filtering in time-frequency representation, such as TFK domain, is considered as multiplying the spectrum TFK(t,f,k) with a weighting function F(t,f,k), that is assigned high values to useful signals and low ones to unwanted. Consequently the filtered output time series is:

$$u_{filter}(t,x) = \int_{-\infty}^{+\infty}\int_{-\infty}^{+\infty}\int_{-\infty}^{+\infty} TFK(\tau,f,k)F(\tau,f,k)d\tau \exp(j2\pi ft)df \exp(j2\pi kx)dk$$

The process for removing a Scholte waves and similar ground roll type waves from a seismic sea bottom data in a shallow water includes the steps of: acquiring seismic sea bottom data in a shallow waters, applying a time-frequency-wave number (t-f-k) transform on the acquired seismic sea bottom data to get a three-dimensional result in a time-frequency-wave number domain, identifying a time-frequency relationship of a surface wave based on a specific wave number, identifying a frequency-wave number relationship of a surface wave based on a specific time, designing a time varying frequency-wave number filter in the time-frequency-wave number domain based on the identified time-frequency relationship and the identified frequency-wave number relationship to separate the surface wave, applying a time varying frequency-wave number filtering process to remove an undesired energy and inversing a filtered record by applying an inverse S-Transform operation and an inverse Fourier Transform operation. The time varying frequency-wave number filtering is performed to filter the time varying seismic waves and to distinguish between signals of the same frequency at different times to extract Scholte waves, interface waves and multiple waves from the ocean bottom seismic data without removing other seismic signals.

The advantage of this method is that a time independent f-k filter in hard bottom shallow water environments is presented. The time independent f-k filter filters time varying seismic waves and distinguishes between signals of the same frequency at different times. The present method extracts Scholte waves, interface waves and multiple waves from OBS data without removing other seismic signals. The present method helps to determine a shear velocity and attenuation for seafloor sediment indirectly through measured propagation characteristics of the surface wave.

The present method also provides a useful tool for seismic data interpretation. The present method allows dynamic analysis on the surface wave spectrum over time by the application of the S transform and t-f-k transform. The present method allows in locating specific time-frequency wave-number zones affected by surface waves, leaving the remainder of the trace unaltered.

In the present method, a S transform is utilized instead of Fourier transform to build a t-f-k filter which provides a convenient way to analyze surface waves on separate f-k panels at different times. The velocity of Scholte waves ranges from 450 m/s to about 2100 m/s depending upon the spatial variation of seabed shear wave velocity. The P-related surface waves usually have a velocity ranging from 1300 m/s to 3500 m/s, which are more severely aliased than other waves in the seismic record. Analysis indicates that the proposed S-t-f-k transform is effective to attenuate these surface waves in this area and improve reflection signal quality, which may be applicable in other similar ultra shallow water environment.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A method for removing Scholte waves and similar ground roll type waves from seismic sea bottom data in shallow waters, the method comprising the steps of:
    acquiring seismic sea bottom data in shallow waters;
    applying a time-frequency-wave number (t-f-k) transform to the acquired seismic sea bottom data to get a three-dimensional result in a time-frequency-wave number domain;
    identifying a time-frequency relationship of a surface wave based on a specific wave number;
    identifying a frequency-wave number relationship of a surface wave based on a specific time;
    designing a time varying frequency-wave number filter in the time-frequency-wave number domain based on the identified time-frequency relationship and the identified frequency-wave number relationship to separate the surface wave;
    applying a time varying frequency-wave number filtering process to remove at least some undesired energy; and
    inversing a filtered record by applying an inverse S-Transform operation and an inverse Fourier Transform operation;
    wherein the time varying frequency-wave number filtering is performed to filter the time varying seismic waves and to distinguish between signals of the same frequency at different times to extract Scholte waves, interface waves and multiple waves from the ocean bottom seismic data without removing other seismic signals.

2. The method according to claim 1, wherein the S-transform operation and the t-f-k transform operation are applied to analyze surface waves and carry out a dynamic analysis on surface wave spectrum over time.

3. The method according to claim 1, wherein the step of applying S transform operation comprises adopting a Gaussian window, and wherein a width of the Gaussian window scales inversely with a frequency and a height of the Gaussian window scales linearly with a frequency, to decompose the signal into a time-frequency independently.

4. The method according to claim 1, wherein the acquired seismic sea bottom data are first transformed from the t-x domain to the t-k domain through one-dimensional Fourier transform over a spatial variable and then to S transform over time.

5. The method according to claim 1, wherein a plurality of types of seismic events are partitioned from one another to separate S-waves to filter unwanted energy, based on a comparison of t-x domain representation with a F-K domain.

6. The method according to claim 1, wherein the step of applying a time varying frequency-wave number filtering process comprises multiplying a time frequency spectrum (TFK) with a weighting function.

7. The method according to claim 6, wherein a weighting function applied to a useful signal is more than a weighting function applied to an unwanted signal.

8. The method according to claim 1, further comprising measuring a propagation characteristics of the surface wave to estimate a shear velocity and attenuation of a sediment in seafloor indirectly.

9. The method according to claim 1, wherein the weighting function for time-frequency-wave number is designed to extract or remove the surface wave, P-related interface waves and reflected waves separately.

* * * * *